Figure 1:
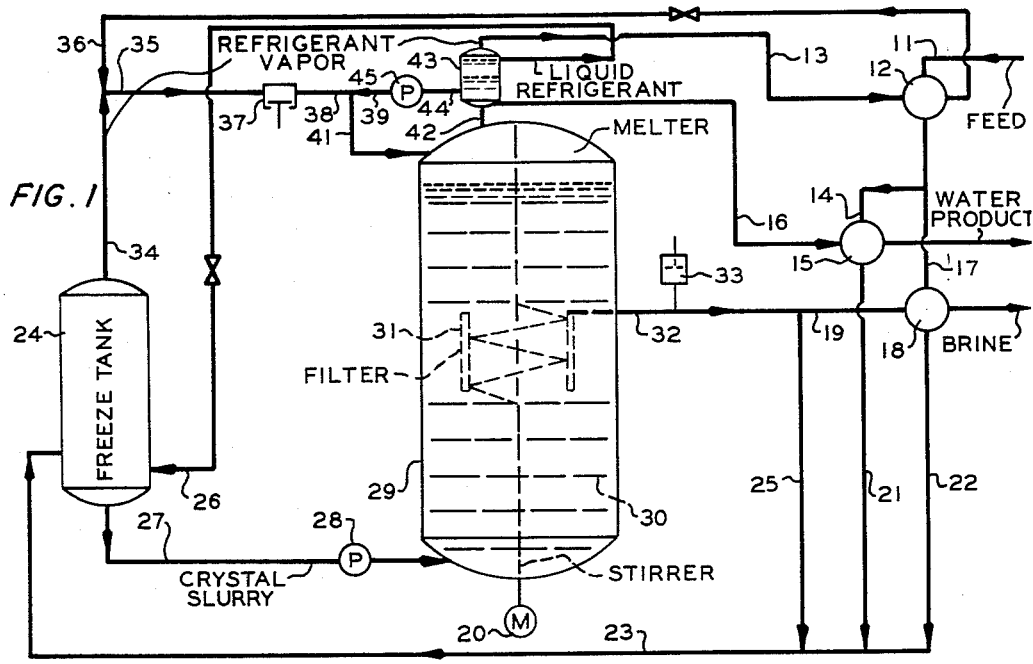

April 5, 1966 D. L. McKAY 3,243,968
FRACTIONAL CRYSTALLIZATION
Filed May 17, 1962

INVENTOR.
D.L. MC KAY
BY Young and Quigg
ATTORNEYS

United States Patent Office 3,243,968
Patented Apr. 5, 1966

3,243,968
FRACTIONAL CRYSTALLIZATION
Dwight L. McKay, Bartlesville, Okla., assignor to Phillips Petroleum Company, a corporation of Delaware
Filed May 17, 1962, Ser. No. 195,459
6 Claims. (Cl. 62—58)

This invention relates to method and apparatus for separating the components of a fluid mixture by means of fractional crystallization. In one aspect the invention relates to method and means for concentrating an aqueous solution with concomitant production of water separated from the solution. In another aspect the invention relates to the recovery of fresh water from sea water. In yet another aspect of the invention relates to the concentration of aqueous solutions and dispersions such as orange juice, milk and the like.

Various methods of separating the components of a fluid mixture, such as the production of fresh water from salt water, have been proposed. A few, including fraction crystallization, have proven effective, but many of these are uneconomical due to the high cost of such operations and are carried out only on a limited basis.

In accordance with the invention there is provided an improved method and apparatus for separating the components of a fluid mixture wherein a refrigerant is passed in heat exchanging relationship with a body of the fluid mixture, thus forming a slurry of crystals of a first component of said mixture in the remaining fluid, the slurry is passed to a purification operation wherein the remaining fluid is separated out as a concentrate and said crystals are melted by contact with a heated liquid stream of said first component and refrigerant, a stream of said first component and refrigerant is withdrawn from said purification operation and separated to produce a purified liquid product stream of said first component and a liquid refrigerant stream, the refrigerant vapors from the chilling operation are compressed in a compression zone and then admixed with a portion of said liquid product stream, and the mixture of liquid product and refrigerant thus obtained is passed to said purification operation as said heated liquid stream.

Accordingly it is an object of the invention to provide an improved method and apparatus for separating components of a fluid mixture. Another object of the invention is to provide a method and means for the recovery of water from an aqueous solution, such as sea water, at less cost than has heretofore been possible. A further object of the invention is to provide method and apparatus for the removal of water from an aqueous solution with a minimum of expended energy. A still further object of the invention is the provision of a method and apparatus for concentrating a solution. Yet another object of the invention is to provide method and means for efficiently utilizing the cooling capacity of the concentrate and/or the separated component. A still further object of the invention is to provide more efficient melting of the crystals in the purification operation.

Other aspects, objects and advantages of the invention will be apparent from a study of the disclosure, the drawing, and the appended claims to the invention.

Figure 2:
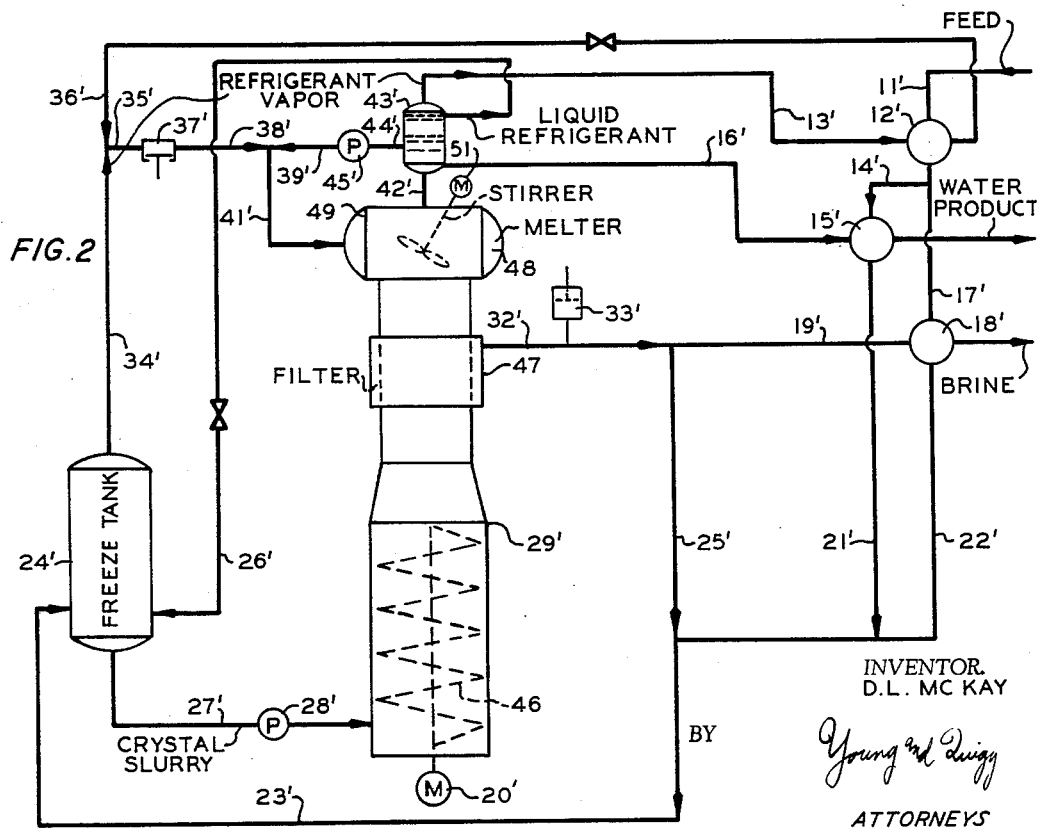

In the drawings FIGURE 1 is a schematic representation of a fractional crystallization system in accordance with a first embodiment of the invention, and FIGURE 2 is a schematic representation of a fractional crystallization system in accordance with a second embodiment of the invention.

For purposes of illustration, the invention will be described in terms of a system for the production of fresh water from sea water, using normal butane as the refrigerant. In the drawing like elements will be referred to with like numerals wherever applicable in the figures which constitute the drawing.

Sea water is passed through conduit 11 into heat exchanger 12 wherein it is cooled by indirect heat exchange with refrigerant vapor in line 13. A portion of the thus cooled sea water is passed through conduit 14 and into heat exchanger 15 wherein it is further cooled by indirect heat exchange with the product water being recovered by way of conduit 16. The remaining portion of the cooled sea water is passed through conduit 17 and into heat exchanger 18 wherein it is further cooled by indirect heat exchange with the concentrated brine being withdrawn from the system via conduit 19. The cooled sea water is withdrawn from heat exchangers 15 and 18 via conduits 21 and 22, respectively, and passed into and through conduit 23 to freeze tank 24. A portion of the concentrated brine in line 19 can be diverted through conduit 25 and introduced into conduit 23.

Liquid butane is passed via conduit 26 into freeze tank 24 wherein it vaporizes and freezes a portion of the water in the brine so as to form a slurry of ice crystals in concentrated brine. Freeze tank 24 can be any suitable device such as a scraped surface heat exchanger or a tank wherein the refrigerant is passed into direct heat exchange with the brine. The slurry of ice crystals in brine is withdrawn from freeze tank 24 via conduit 27 and passed by means of pump 28 to a lower portion of crystal purification column 29. A stirrer 30 is positioned within crystal purification column 29 and is driven by motor 20 so as to maintain a uniform mass of crystals and prevent channeling of the displaced liquid by eliminating possible bridging of crystals within the column. A filter 31 is axially positioned within column 29 so that as the slurry of ice crystals and brine is passed upwardly through the column, the concentrated brine is withdrawn from the column through filter 31 and is passed by way of conduits 32 and 19 and heat exchanger 18 to disposal. A pulse unit 33 is provided on conduit 32 for the puropse of backwashing filter 31 to keep the filter clean and also to pulse the column.

The vaporized refrigerant is removed from freeze tank 24 via conduit 34 and admixed in conduit 35 with heated refrigerant vapors which have been withdrawn from heat exchanger 12 via conduit 36. The thus combined refrigerant vapors are compressed by compressor 37 and passed through conduit 38 to conduit 39 wherein the compressed refrigerant is admixed with a portion of water product from purification column 29, thus condensing the refrigerant and heating the water product. The resulting mixture is passed via conduit 41 into an upper portion of purification column 29. The mixture entering the purification column via conduit 41 melts the ascending mass of ice crystals so that the refrigerant and a portion of the liquid water rise to the upper portion of the column and another portion of the liquid water is displaced downwardly through the ascending mass of ice crystals, washing therefrom the occluded brine solution. The downwardly passing water eventually refreezes and ascends through the column as a portion of the mass of ice crystals.

The refrigerant and a portion of the liquid water are withdrawn from purification column 29 via conduit 42 and passed to phase separator 43 wherein the water product and refrigerant form separate phases. A portion of the water is withdrawn from phase separator 43 via conduit 16 and passed through heat exchanger 15 and then withdrawn from the system as product water. The remainder of the water is withdrawn from phase separator 43 via conduit 44 and passed through pump 45 into conduit 39 wherein it is admixed with the refrigerant vapors in conduit 38. Liquid refrigerant is withdrawn from phase separator 43 and passed through conduit 26 to freeze tank 24. That portion of the refrigerant which is in a vapor state is withdrawn from phase separator 43 via conduit 13 and passed through heat exchanger 12 and conduit 36 to conduit 35 wherein it is admixed with the refrigerant vapors from freeze tank 24.

A modification of the process described in FIGURE 1 is shown in FIGURE 2 wherein the crystal purification column 29' contains a screw conveyor 46 which is driven by motor 20' for the purpose of forcing the crystals upwardly through the column. Also filter 47 comprises a perforated section of purification column 29' and is situated so as to withdraw the concentrated brine from the column with a minimum of impedance of the flow of crystals. Crystal purification column 29' is also provided with a melting chamber 48 at the upper end thereof. A stirrer 49 is mounted within melting chamber 48 and is driven by motor 51 to obtain a more homogeneous mixture of the refrigerant and melted water to insure contact of the ice crystals to be melted with water. The operation of the process of FIGURE 1 is otherwise similar to the operation of the process of FIGURE 2.

In the process described with respect to FIGURES 1 and 2 normal butane is used as the refrigerant for the recovery of fresh water from sea water. In the operating of such a process it is desirable that energy costs be minimized. One manner in which this can be accomplished in accordance with the present invention is the minimization of the temperature difference between the heat source (brine from which ice crystals are frozen) and the heat sink (ice crystals to be melted) by direct heat exchange of the refrigerant with the heat source and the heat sink. Thus the liquid refrigerant can be introduced directly into a body of the brine in freeze tank 24 whereby the refrigerant vaporizes and freezes a portion of the water in the brine. Also the refrigerant vapors from freeze tank 24 can be utilized in the melting of the ice crystals. It is a feature of the invention that a portion of the water product is admixed with the refrigerant vapors from the freeze tank and the mixture thus obtained is introduced into the melting zone of the purification operation to melt the ice crystals and to insure that the ice crystals are contacted by water so that purification can be achieved by melting of the ice crystals and refreezing of the purified water. The introduction of a mixture of refrigerant and product water into the melting zone of the purification column is also advantageous over the introduction of only refrigerant vapors in that the channeling effects of the refrigerant vapors are substantially reduced.

A slurry of the concentrated brine and ice crystals is transferred continuously from freeze tank 24 to purification column 29 and as this slurry is passed through the purification column it passes through a consolidation and washing zone wherein the ice crystals are continuously washed as they pass the brine and water interface and are concentrated into a mass of substantially pure ice crystals. The mass of ice crystals is melted by contact with purified water and the liquid refrigerant which was liquefied by admixing therewith a portion of the product water before the introduction thereof into the purification column. A further minimization of thermal energy requirements is accomplished by the passage of refrigerant vapors from phase separator 43 into heat exchanging relationship with the sea water feed stream.

The invention has been described as applied to the preferred embodiment of recovering fresh water from sea water, using normal butane as the refrigerant. Butane is a preferred refrigerant because of the small difference in the boiling point of the refrigerant at low pressure and the freezing point of water; however, other refrigerants are applicable in the practice of this invention. Other preferred refrigerants include propane; isobutane; the butenes, e.g., 1-butene; the various polychlorofluoromethanes (Freons); halogenated hydrocarbons, e.g., ethyl chloride; and the like. Any refrigerant having a vapor pressure of about ½ to about 5 atmospheres at temperatures in the range from about 20 to 32° F., which are essentially insoluble in water at these conditions can be utilized advantageously in the practice of this invention. Refrigerants which have limited solubility in water, such as $CO_2$ and binary mixtures of $CO_2$ and hydrocarbons such as pentane can be selected so as to provide a refrigerant having the properties of the preferred refrigerants hereinbefore defined. When utilizing refrigerants having appreciable solubility in water, it will usually be advantageous to include steps for recovering the refrigerant from the salt-free water and the brine streams removed from the system.

The invention is not limited to the recovery of fresh water from sea water but can also be applied to the concentration of any aqueous solution, for example, the concentration of fruit juices, milk, sugar solutions, and the like. The temperatures and pressures employed will be those required to vaporize the liquid refrigerant in the freeze tank to form ice crystals in the solution to be concentrated and to melt the ice crystals in the purification column to form liquid water and liquid refrigerant.

The advantage of using normal butane which has a vapor pressure of 15 p.s.i.a. at 32° F. becomes apparent because the freeze tank can be operated at slightly less than atmospheric pressure and the purification column can be operated at slightly more than atmospheric pressure. Compression of the vaporized normal butane withdrawn from the freeze tank is substantially the only energy requirement for the process. When the freeze tank is operated at atmospheric pressure or greater, a pump is required to feed the brine to the freeze tank.

The freeze tank can be operated at about 3 or more p.s.i., e.g., 3 to 10 p.s.i., below the vapor pressure of the refrigerant at 32° F. and the purification column can be operated at about 3 or more p.s.i., e.g., 3 to 10 p.s.i. above the vapor pressure of the refrigerant at 32° F.

*Specific example*

| Stream No. | Temp., °F. | Press., p.s.i.a. | Liquid $H_2O$, Lb. | Solid $H_2O$, Lb. | NaCl, Lb. | $C_4$ Liq., Lb. | $C_4$ Vapor, Lb. |
|---|---|---|---|---|---|---|---|
| 11 | 60 | | 970 | | 30 | | |
| 23 | 31 | | 970 | | 30 | | |
| 27 | 25 | | 600 | 370 | 30 | | |
| 32 | 25 | | 600 | | 29.7 | | |
| 16 | 40 | | 370 | | 0.3 | | |
| 26 | 40 | 18 | | | | 375 | |
| 34 | 25 | 12 | | | | | 375 |
| 33 | 100 | 52 | | | | | 400 |
| 44 | 40 | 18 | 1,000 | | | | |
| 42 | 40 | 18 | 1,370 | | 0.3 | 375 | 25 |
| 13 | 40 | 18 | | | | | 25 |
| 36 | 55 | 12 | | | | | 25 |

A suitable ratio of refrigerant to feed is 0.375 pound of refrigerant circulated per pound of sea water feed. By recycling brine through line 25, the process can produce a half pound or more of fresh water for each pound of sea water in the feed to the process.

Reasonable variation and modification are possible within the scope of the foregoing disclosure, the drawings, and the appended claims to the invention.

I claim:

1. A method for concentrating an aqueous solution which comprises passing a stream of said solution into a freezing zone; introducing liquid refrigerant into said freezing zone; chilling said solution by the evaporation of said refrigerant in said freezing zone, thereby forming a slurry of ice crystals in mother liquor; passing said slurry to a purification zone; filtering said mother liquor from said ice crystals in said purification zone and withdrawing the concentrated mother liquor therefrom as a first product; withdrawing refrigerant vapors from said freezing zone; compressing said withdrawn refrigerant vapors; admixing said compressed refrigerant vapors with purified water, thereby warming said purified water and substantially condensing said compressed refrigerant vapors; introducing the resulting warm mixture of refrigerant and purified water into said purification zone and countercurrently to the flow of ice crystals therein; withdrawing and passing purified water and refrigerant from said purification zone to a phase separation zone and thereby separating same; withdrawing a portion of the purified water from said phase separation zone as a product, passing a portion of said purified water in said phase separation zone to said admixing step as the purified water therein; withdrawing refrigerant from said phase separation zone, and passing liquid refrigeration withdrawn from said phase separation zone to said freezing zone as the liquid refrigerant introduced thereto.

2. The method of claim 1 further comprising withdrawing uncondensed refrigerant vapors from said phase separation zone; warming said withdrawn uncondensed refrigerant vapors by indirectly heat exchanging with said aqueous solution; and combining the resulting warm refrigerant vapors from said freezing zone.

3. The method of claim 2 further comprising applying a pulsating pressure to said purification zone.

4. The method of claim 3 wherein said aqueous solution is salt water and said refrigerant is normal butane.

5. Apparatus for the concentration of an aqueous solution comprising a freeze tank; means for passing said solution into said freeze tank; means for evaporating a refrigerant through said solution contained in said freeze tank; a purification unit having a filter section and a melter section; means for passing an ice-containing slurry from said freeze tank to said purification unit; means for withdrawing concentrated mother liquor from the filter section of said purification unit; means for applying a pulsating pressure to said purification unit; means for introducing a mixture of refrigerant and purified water into the melter section of said purification unit and countercurrently to the flow of ice crystals in said purification unit; a phase separator means for withdrawing refrigerant and purified water from the melter section of said purification unit and passing same into said phase separator; means for withdrawing a first portion of purified water from said phase separator; means for withdrawing and compressing refrigerant vapors from said freeze tank; means for admixing and substantially condensing the thus compressed refrigerant vapors with said withdrawn first portion of purified water; means for passing the resulting warm admixture to said means for introducing; means for withdrawing the remainder of said purified water from said phase separator; and means for withdrawing and passing liquid refrigerant from said phase separator to said means for evaporating.

6. The apparatus of claim 5 further comprising means for withdrawing and passing uncondensed refrigerant vapors from said phase separator in indirect heat exchange relationship with said solution; and means for passing the thus-heated refrigerant vapors to said means for withdrawing and compressing refrigerant vapors from said freezing tank.

References Cited by the Examiner

UNITED STATES PATENTS

| 2,683,178 | 7/1954 | Findlay | 62—58 |
| 2,821,304 | 1/1958 | Zarchin | 62—58 |
| 2,854,494 | 9/1958 | Thomas | 62—58 |
| 3,017,751 | 1/1962 | Hawkins | 62—58 |

FOREIGN PATENTS

| 217,766 | 3/1958 | Australia. |
| 70,507 | 6/1946 | Norway. |

NORMAN YUDKOFF, *Primary Examiner.*

ROBERT F. BURNETT, *Examiner.*